United States Patent
Mace et al.

(10) Patent No.: US 8,266,114 B2
(45) Date of Patent: Sep. 11, 2012

(54) LOG STRUCTURED CONTENT ADDRESSABLE DEDUPLICATING STORAGE

(75) Inventors: James E. Mace, San Francisco, CA (US); Nitin Parab, Menlo Park, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 352 days.

(21) Appl. No.: 12/235,325

(22) Filed: Sep. 22, 2008

(65) Prior Publication Data

US 2010/0082547 A1    Apr. 1, 2010

(51) Int. Cl.
    *G06F 17/00* (2006.01)
(52) U.S. Cl. .................... 707/692; 707/648; 707/661
(58) Field of Classification Search .......... 1/1; 707/607, 707/625, 648, 674, 692, 661, 999.204, 999.206; 711/1, 4, 100, 101, 111; 700/1, 90, 91
    See application file for complete search history.

(56) References Cited

U.S. PATENT DOCUMENTS

| | | | | |
|---|---|---|---|---|
| 5,440,738 A * | 8/1995 | Bowman et al. | ................. | 1/1 |
| 6,058,392 A * | 5/2000 | Sampson et al. | ................. | 1/1 |
| 6,539,396 B1 * | 3/2003 | Bowman-Amuah | .......... | 707/769 |
| 7,725,704 B1 * | 5/2010 | Beaverson et al. | ................ | 713/2 |
| 7,818,535 B1 * | 10/2010 | Bono et al. | .................... | 711/173 |
| 7,921,077 B2 * | 4/2011 | Ting et al. | ....................... | 707/610 |
| 8,032,498 B1 * | 10/2011 | Armangau et al. | ........... | 707/690 |
| 2004/0139124 A1 * | 7/2004 | Kawamura et al. | ........... | 707/202 |
| 2006/0253418 A1 * | 11/2006 | Charnock et al. | ................. | 707/1 |
| 2007/0061487 A1 * | 3/2007 | Moore et al. | ................... | 709/246 |
| 2008/0005141 A1 * | 1/2008 | Zheng et al. | ................... | 707/101 |
| 2008/0281908 A1 * | 11/2008 | McCanne et al. | ............. | 709/203 |

* cited by examiner

*Primary Examiner* — Dennis Truong
(74) *Attorney, Agent, or Firm* — Park, Vaughan, Fleming & Dowler LLP

(57) ABSTRACT

A log structured content addressable deduplicated data storage system may be used to store deduplicated data. Data to be stored is partitioned into data segments. Each unique data segment is associated with a label. The storage system maintains a transaction log. Mutating storage operations are initiated by storing transaction records in the transaction log. Additional transaction records are stored in the log when storage operations are completed. Upon restarting an embodiment of the data storage system, the transaction records from the transaction logs are replayed to recreate the state of the data storage system. The data storage system updates file system metadata with transaction information while a storage operation associated with the file is being processed. This transaction information serves as atomically updated transaction commit points, allowing fully internally consistent snapshots of deduplicated volumes to be taken at any time.

17 Claims, 12 Drawing Sheets

LOG STRUCTURED CONTENT ADDRESSABLE DEDUPLICATING STORAGE

CROSS REFERENCE TO RELATED APPLICATIONS

This application is related to U.S. patent application Ser. No. 12/117,629, filed May 8, 2008, and entitled "Hybrid Segment-Oriented File Server and WAN Accelerator"; and U.S. patent application Ser. No. 12/416,057 filed Mar. 31, 2009, and entitled "Virtual File System Stack for Data Deduplication," both of which are incorporated by reference herein for all purposes.

BACKGROUND

The present invention relates generally to data storage systems, and systems and methods to improve storage efficiency, compactness, performance, reliability, and compatibility. In computing, a file system specifies an arrangement for storing, retrieving, and organizing data files or other types of data on data storage devices, such as hard disk devices. A file system may include functionality for maintaining the physical location or address of data on a data storage device and for providing access to data files from local or remote users or applications. A file system may include functionality for organizing data files, such as a directories, folders, or other container structures for files. Additionally, a file system may maintain file metadata describing attributes of data files, such as the length of the data contained in a file; the time that the file was created, last modified, and/or last accessed; and security features, such as group or owner identification and access permission settings (e.g., whether the file is read-only, executable, etc.).

Many file systems are tasked with handling enormous amounts of data. Additionally, file systems often provide data access to large numbers of simultaneous users and software applications. Users and software applications may access the file system via local communications connections, such as a high-speed data bus within a single computer; local area network connections, such as an Ethernet networking or storage area network (SAN) connection; and wide area network connections, such as the Internet, cellular data networks, and other low-bandwidth, high-latency data communications networks.

The term "data deduplication" refers to some process of eliminating redundant data for the purposes of storage or communication. Data deduplicating storage typically compares incoming data with the data already stored, and only stores the portions of the incoming data that do not match data already stored in the data storage system. Data deduplicating storage maintains metadata to determine when portions of data are no longer in use by any files or other data entities.

The CPU and I/O requirements for supporting an extremely large data deduplicating storage are significant, and are difficult to satisfy through vertical scaling of a single machine. Additionally, data deduplicating storage must be both reliable, robust, and easily expandable to increase data traffic and storage capacity. However, prior data deduplicating storage systems have been difficult to scale, unreliable, and vulnerable to data loss in the event of system crashes and restarts.

BRIEF SUMMARY

An embodiment of the invention includes a log structured content addressable deduplicated data storage system, which may be used to store deduplicated data for WAN acceleration, file systems, and/or application data storage, such as database systems. Data to be stored is partitioned into data segments. Each unique data segment is associated with a label. An embodiment of the storage system maintains a transaction log. Mutating storage operations are initiated by storing transaction records in the transaction log. Additional transaction records are stored in the log when storage operations are completed.

Upon restarting an embodiment of the data storage system, the transaction records in the transaction logs are replayed to recreate the memory state of the data storage system prior to being restarted. A further embodiment of the data storage system updates file system metadata with transaction information while a storage operation associated with the file is being processed. This transaction information serves as atomically updated transaction commit points, allowing fully internally consistent snapshots of deduplicated volumes to be taken at any time.

An embodiment of the data storage system includes a label cache for storing labels and label metadata in memory. Data segments are stored on disk in data files and optionally in an in-memory cache. An embodiment of the data storage system may serialize the label cache and on-disk data segments to create a static archive. Static archives may be searched to retrieve data segments or to mark data segments for deletion. In an embodiment, the data storage system may merge two or more static archives into a new combined static archive. The combined static archive may omit any data segments previously marked for deletion.

BRIEF DESCRIPTION OF THE DRAWINGS

The invention will be described with reference to the drawings, in which.

In the drawings, the use of identical reference numbers indicates identical elements.

DETAILED DESCRIPTION OF ILLUSTRATIVE EMBODIMENTS

The term "data deduplication" refers to some process of eliminating redundant data for the purposes of storage or communication. To reduce the storage capacity requirements and improve data system performance, embodiments of the invention include a content addressable deduplicated data storage system. As described in detail below, embodiments of the storage system additionally use transaction logging to provide high reliability and fault tolerance.

Figure 1A:
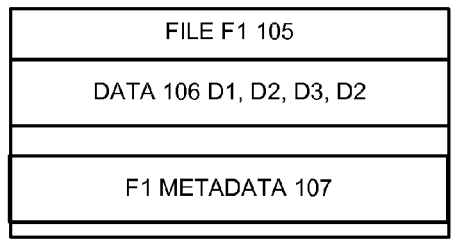
FIGS. 1A and 1B illustrate data deduplication suitable for use with embodiments of the invention.
Figure 1A:
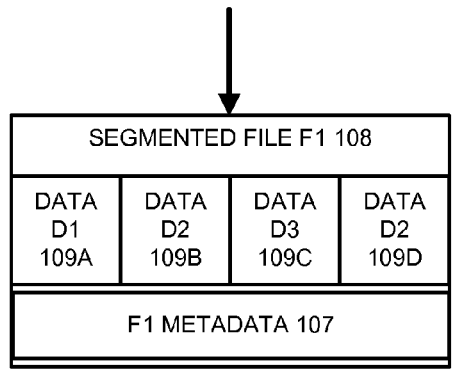
Figure 1A:
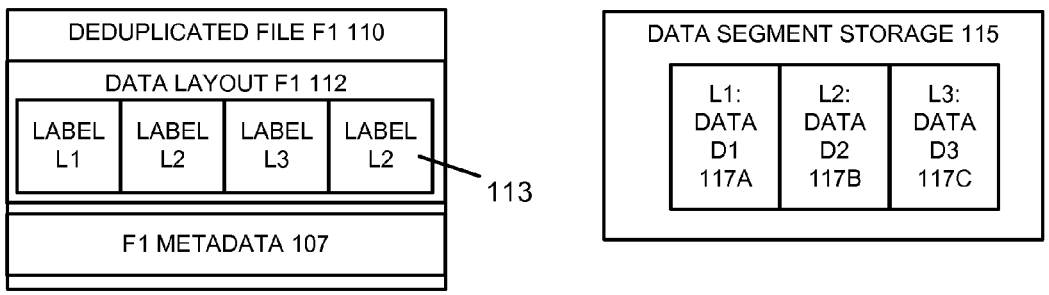
Figure 1B:
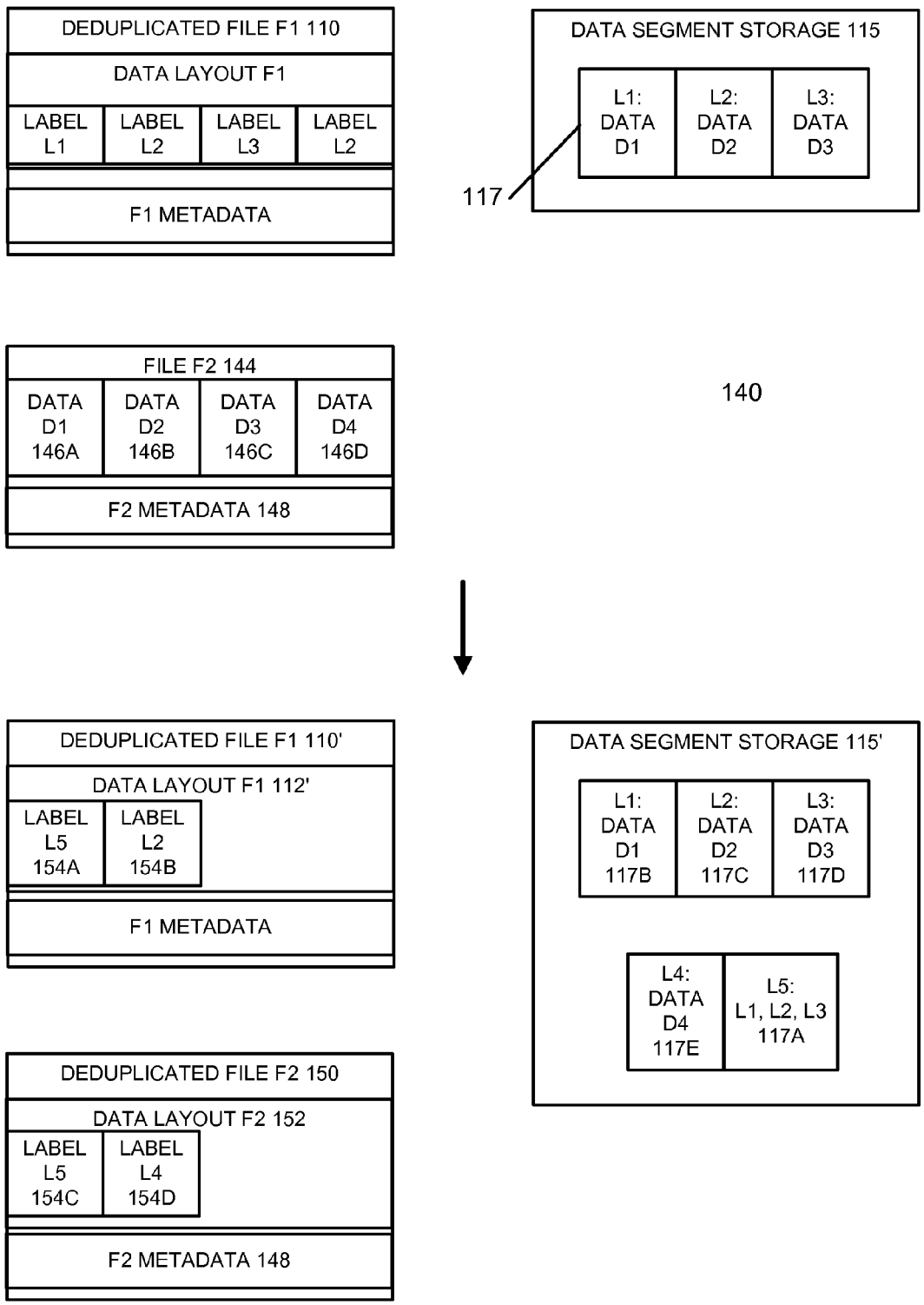

FIGS. 1A and 1B illustrate examples of data deduplication suitable for use with embodiments of the invention. FIG. 1A illustrates an example 100 of a deduplicating file storage suitable for use with an embodiment of the invention. A file F1 105 includes file data 106 and file metadata 107. In an embodiment, the file data 106 is partitioned or segmented into one or more segments based on factors including the contents of the file data 106, the potential size of a segment, and the type of file data. There are many possible approaches for segmenting data for the purposes of deduplication, some of which use hashes or other types of data characterizations. One approach is the hierarchical segmentation scheme described in U.S. Pat. No. 6,667,700 entitled "Content-Based Segmentation Scheme for Data Compression in Storage and Transmission Including Hierarchical Segment Representation," which is incorporated by reference herein for all purposes. Hierarchical schemes which make use of hashes may take on a number of variations according to various embodiments, including making use of hashes of hashes. In addition, many other segmentation schemes and variations are known in the art and may be used with embodiments of the invention.

Regardless of the technique used to segment file data 107, the result is a segmented file 108 having its file data represented as segments 109, such as segments 109a, 109b, 109c, and 109d in example 100. In example 100, segment 109a includes data D1 and segment 109c includes data D3. Additionally, segments 109b and 109d include identical copies of data D2. Segmented file 108 also includes the same file metadata 107 as file 105. In some embodiments of the invention, file data segmentation occurs in memory and segmented file 108 is not written back to data storage in this form.

Following the segmentation of the file data 106 into file segments 109, each segment is associated with a unique label. In example 100, segment 109a representing data D1 is associated with label L1, segments 109b and 109d representing data D2 are associated with label L2, and segment 109c representing data D3 is associated with label L3. In an embodiment, the file F1 105 is replaced with deduplicated file F1 110. Deduplicated file F1 110 includes data layout F1 112 specifying a sequence of labels 113 corresponding with the data segments identified in the file data 106. In this example, the data layout F1 112 includes a sequence of labels L1 113a, L2 113b, L3 113c, L2 113d, corresponding with the sequence of data segments D1 109a, D2 109b, D3 109c, and a second instance of segment D2 109d. Deduplicated file 110 also includes a copy of the file metadata 107.

A data segment storage 115 includes copies of the segment labels and corresponding segment data. In example 100, data segment storage 115 includes segment data D1, D2, and D3, and corresponding labels L1, L2, and L3. Using the data layout within a file and the data segment storage 115, a storage system can reconstruct the original file data by matching in sequence each label in a file's data layout with its corresponding segment data from the data segment storage 115.

As shown in example 100 of FIG. 1A, the use of data deduplication reduces the storage required for file F1 105, assuming that the storage overhead for storing labels 117 in the data layout 115 and data segment storage 115 is negligible. Furthermore, data deduplication can be applied over multiple files to further increase storage efficiency and increase performance.

FIG. 1B illustrates an example 140 of data deduplication applied over several files. Example 140 continues the example 100 and begins with deduplicated file F1 110 and data segment storage 115 as described above. Example 140 also includes a second file, file F2 144 including file metadata 148 and file data segmented into data segments D1 146a, D2 146b, D3 146c, and D4 146d. Data segments 146a, 146b, and 146c are identical in content to the data segments 109a, 109b, and 109c, respectively, discussed in FIG. 1A.

In an embodiment, the file F2 144 is replaced with deduplicated file F2 150. Deduplicated file F2 150 includes data layout F2 152 specifying a sequence of labels 154 corresponding with the data segments identified in the file data 146. In this example, the data layout F2 152 includes a sequence of labels L5 154c and L4 154d. Additionally, example 140 replaces deduplicated file F1 110 with a more efficient deduplicated file F1 110'. The deduplicated file F1 110' includes data layout 112' including labels L5 154a and L2 154b. In further embodiments, the segmentation of files into hierarchical data layouts such as data layout 112' may be performed in a single pass through the file data, bypassing any intermediate non-hierarchical data layouts such as data layout 112.

An updated data segment storage 115' includes copies of the segment labels and corresponding segment data. In example 140, data segment storage 115' includes segment data D1 and labels L1 117b, segment data D2 and label L2 117c, segment data D3 and label L3 117d, and segment data D4 and label L4 117e.

Additionally, in this example implementation of data deduplication, labels may be hierarchical. A hierarchical label is associated with a sequence of one or more additional labels. Each of these additional labels may be associated with data segments or with further labels. For example, data segment storage 115' includes label L5 117a. Label L5 117a is associated with a sequence of labels L1, L2, and L3, which in turn are associated with data segments D1, D2, and D3, respectively.

Using the data layout within a file and the data segment storage 115', a storage system can reconstruct the original file data of a file by recursively matching each label in a file's data layout with its corresponding segment data from the data segment storage 115'. The sequence of labels within a data layout determines the arrangement of corresponding segment data within the reconstructed file data. For example, a storage system may reconstruct the data of file F2 144 by matching label L5 154c in data layout F2 152 with the sequence of labels "L1, L2, and L3" using label 117a in data segment storage 115'. The storage system then uses the sequence of labels L1 117b, L2 117c, and L3 117d to reconstruct data segments D1 146a, D2 146b, and D3 146c in file F2. Similarly, label 154d in data layout F2 152 is matched to label 117e in data segment storage 115', which reconstructs data segment D4 146d.

Although the examples 100 and 140 illustrate data deduplication for files, embodiments of the invention are not limited to file storage and may use data deduplication to store any arbitrary type of data, such as the contents of database tables, business and financial records, electronic mail messages, and electronic documents and document databases. Additionally, embodiments of the invention may apply data deduplication across different types of data. For example, a deduplicating data storage may use the same data segments to represent identical data stored in a file, an e-mail message, and a database table.

Figure 2A:
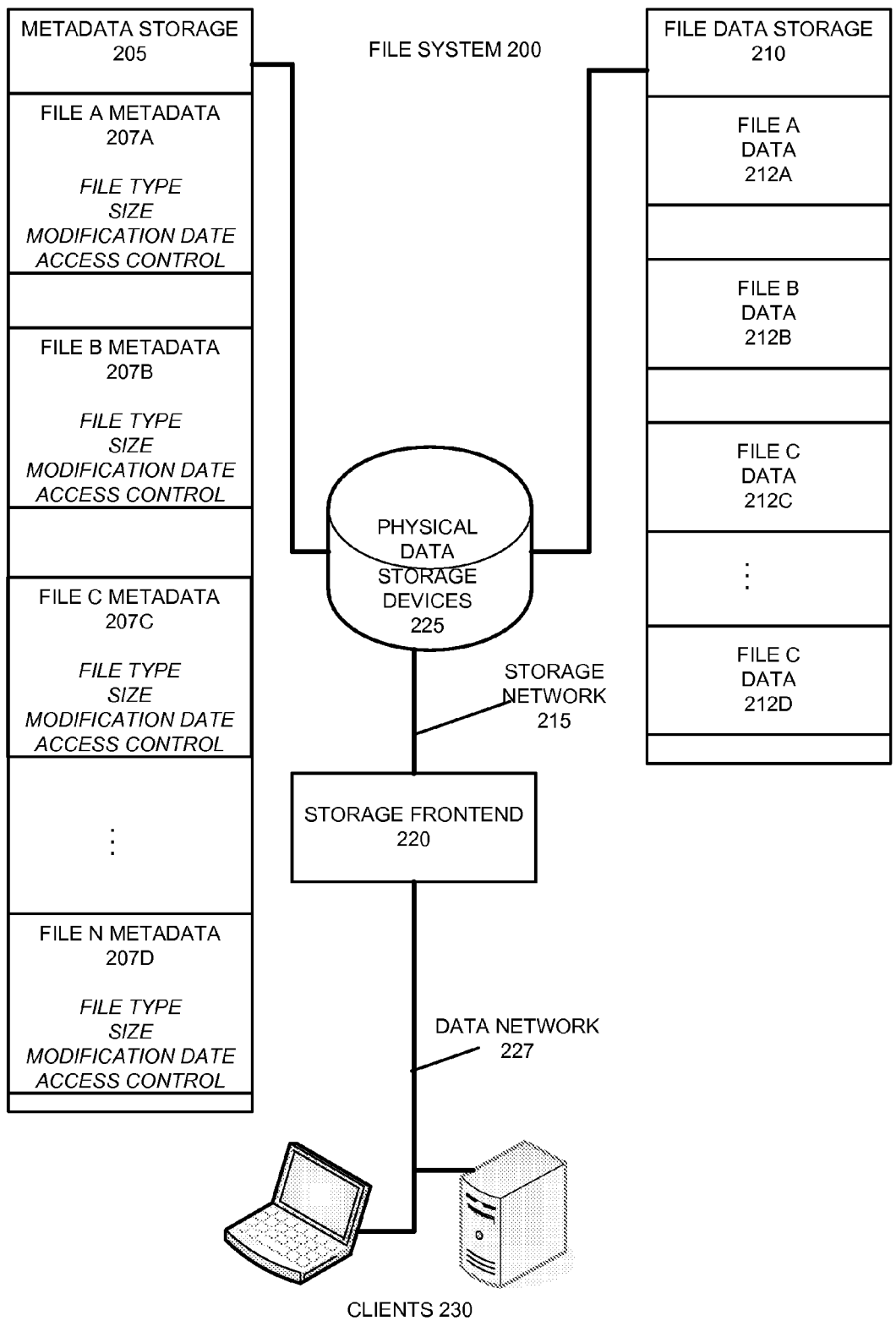
FIGS. 2A and 2B illustrate a data deduplicated file storage system suitable for use with embodiment of the invention.
Figure 2B:
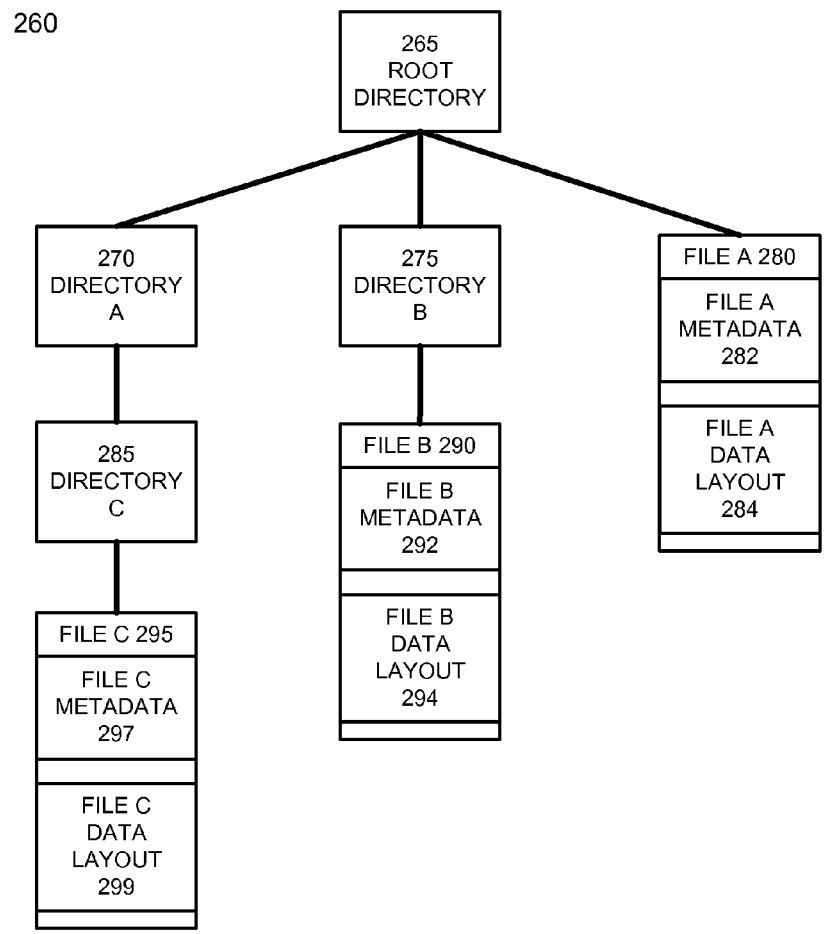
Figure 2B:
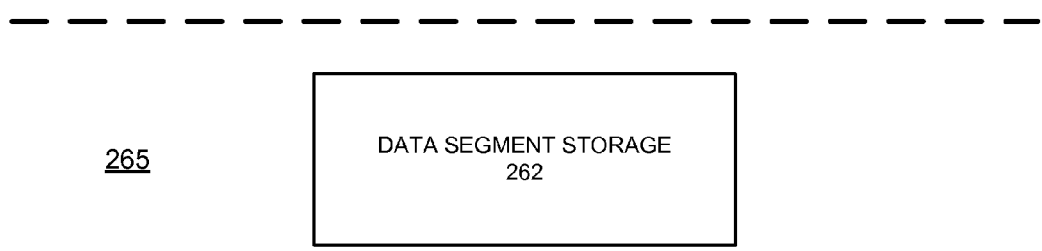

One usage of a deduplicating data storage system is to implement a file system for efficiently storing files. FIGS. 2A and 2B illustrate a data deduplicated file storage system suitable for use with embodiment of the invention. FIG. 2A illustrates an example arrangement of data and metadata of a file system 200 according to an embodiment of the invention. In file system 200, the file data and file metadata are stored in separate logical, and potentially physical, locations. This allows the file system 200 to scale more efficiently over large numbers of storage devices.

File system 200 includes metadata storage 205. Metadata storage 205 includes metadata 207 for all of the files and other objects, such as directories, aliases, and symbolic links, stored by the file system. For example, metadata storage 205 may store metadata 207a, 207b, and 207c associated with files A 120, B 130, and C 135 of file system 100 in FIG. 1, in addition to metadata 207d for any additional files or objects in the file system.

File system 200 also includes file data storage 210. File data storage 210 includes data 212 for all of the files and other objects, such as directories, aliases, and symbolic links, stored by the file system. For example, data storage 210 may store data 212a, 212b, and 212c associated with files A 280, B 290, and C 285 of file system 260 in FIG. 2B, in addition to data 212d for any additional files or objects in the file system. The data 212 may be stored in its native format, as specified by applications or users, or, as described in detail below, the data 212 may be transformed, compressed, or otherwise modified to improve storage efficiency, file system speed or performance, or any other aspect of the file system 200.

Embodiments of metadata storage 205 and data storage 210 may each be implemented using one or more physical data storage devices 225, such as hard disks or hard disk arrays, tape libraries, optical drives or optical disk libraries, or volatile or non-volatile solid state data storage devices. Metadata storage 205 and data storage 210 may be implemented entirely or partially on the same physical storage devices 225 or may be implemented on separate data storage devices. The physical data storage devices 225 used to implement metadata storage 205 and data storage 210 may each comprise a logical storage device, which in turn is comprised of a number of physical storage devices, such as RAID devices.

The metadata storage 205 and data storage 210 are connected with storage front-end 220. In an embodiment, storage front-end 220 is connected with the physical storage devices 225 storing metadata storage 205 and data storage 210 via storage network 215. Storage network 215 may include Fibre Channel, InfiniBand, Ethernet, and/or any other type of physical data communication connection between physical storage devices 225 and the storage front-end 220. Storage network 215 may use any data communications or data storage protocol to communicate data between physical storage devices 225 and the front-end 220, including Fibre Channel Protocol, iFCP, and other variations thereof; SCSI, iSCSI, HyperSCSI, and other variations thereof; and ATA over Ethernet and other storage device interfaces.

The storage front-end 220 is adapted to interface one or more client systems 230 with the data and metadata stored by the file system 200. In this example, the term client means any computer or device accessing the file system 200, including server computers hosting applications and individual user computers. A client 230 may connect with storage front-end via network connection 227, which may include wired or wireless physical data communications connections, for example Fibre Channel, Ethernet and/or 802.11x wireless networking connection, and may use networking protocols such TCP/IP or Fibre Channel Protocol to communicate with storage front-end 220.

The storage front-end 220 may present the data and metadata of the file system 200 to clients as a virtual file system, such that the underlying structure and arrangement of data and metadata within the metadata storage 205 and data storage 210 is hidden from clients 230. Instead, the storage front-end 220 presents clients 230 with a view of the file system data and metadata as a local or networked file system, such as an XFS, CIFS, or NFS file system. In further embodiments, the storage front-end 220 may provide additional types of data interfaces, such as database interfaces, to clients and applications. Because the storage front-end 220 presents a virtual file system to one or more clients 230, depending upon the file system protocol, a client may believe that it is managing files and data on a raw volume directly. The storage front-end 220 intercepts and processes all client commands to the virtual file system, accesses and optionally updates the data and metadata in the data storage 210 and metadata storage 205, and optionally provides a result back to the clients 230. In processing client commands to the virtual file system, the storage front-end may perform data processing, caching, data transformation, data compression, and numerous other operations to translate between the virtual file system and the underlying format of data in the data storage 210 and metadata storage 205.

As shown in FIG. 2A, file system 200 separates the storage of file metadata from the storage of file data for improved efficiency, performance, and scalability. The data layouts and file system metadata of files in a deduplicating data storage system may be arranged in a number of ways. FIG. 2B illustrates one example of a deduplicating file system 260 according to an embodiment of the invention. File system 260 organizes files within a hierarchy of directories. For example, root directory 265 includes directories A 270 and B 275 as well as file A 280. Directory B 275 includes file B 290. Directory A 270 includes directory C 285. Directory C 285 includes file C 295.

In example file system 260, each file may include a file data layout and file metadata. As described above, file data layout specifies a sequence of labels representing data segments needed to reconstruct the original data of the file. For example, file A 280 includes file A data layout 284 and file C metadata 282, file B 290 includes file B data layout 294 and file B metadata 292, and file C 295 includes file C data layout 299 and file C metadata 297.

The data segment storage 262 exists as one or more separate files. In an embodiment, the data segment storage 262 is implemented as visible or hidden files on a separate logical storage partition or storage device. In a further embodiment, the data segment storage 262 is implemented in a manner similar to file data storage 210 discussed above. Additionally, the deduplicated file system 260 may be implemented, at least in part, using the metadata storage 205 discussed above.

In an embodiment, file data layout may be stored as the contents of the file.

A file system may support multiple data streams or file forks for each file. A data stream is an additional data set associated with a file system object. Many file systems allow for multiple independent data streams. Unlike typical file metadata, data streams typically may have any arbitrary size, such as the same size or even larger than the file's primary data. Each data stream is logically separate from other data streams, regardless of how it is physically stored. For files with multiple data streams, file data is typically stored in a primary or default data stream, so that applications that are not aware of streams will be able to access file data. File systems such as NTFS refer to logical data streams as alternate data streams. File systems such as XFS use the term extended attributes to describe additional data streams.

In an embodiment, the data layout of a deduplicated file may be stored in one or more separate data streams. The primary or default data stream of a file may be empty or contain other data associated with a file object. In this embodiment, the deduplicated file system is a "shell" of the original file system. The deduplicated file system preserves the hierarchy structure and potentially the file metadata of the original, non-deduplicated file system in its original format. However, the file data itself is removed from file objects and replaced with data layouts in a different data stream.

As discussed above, changing the structure of a file system, the arrangement of file data and metadata, and data transformations such as data duplication can improve the efficiency, performance, scalability, and even the reliability of data storage systems. However, applications and users typically expect to interact with more typically structured file systems and file data.

Because of this need, a storage front-end interfaces between the file system in its native format and users and applications. The storage front-end may present the data and metadata of the file system to clients as a virtual file system, such that the underlying structure and arrangement of data and metadata is hidden from users and applications. Instead, the storage front-end presents users and applications with a view of the file system data and metadata as a local or networked file system, such as an XFS, CIFS, or NFS file system. Because the storage front-end presents a virtual file system to one or more users or applications, depending upon the file system protocol, a user or application may believe that it is managing files and data on a raw volume directly. The storage front-end intercepts and processes all client commands to the virtual file system, accesses and optionally updates the data and metadata in the underlying file data and metadata storage in the native file system, and optionally provides a result back to the users or applications.

An embodiment of the invention includes a log structured content addressable deduplicated data storage system. This embodiment of a data storage system may be used to implement file data storage and/or file metadata storage, as described above, as part of a deduplicating file system. This embodiment of the data storage system may also be used for storing deduplicated data for WAN acceleration, either alone or in conjunction with a deduplicating file system. Further applications of this embodiment of the data storage system may be used to store deduplicated data from other applications, such as database systems.

Figure 3:
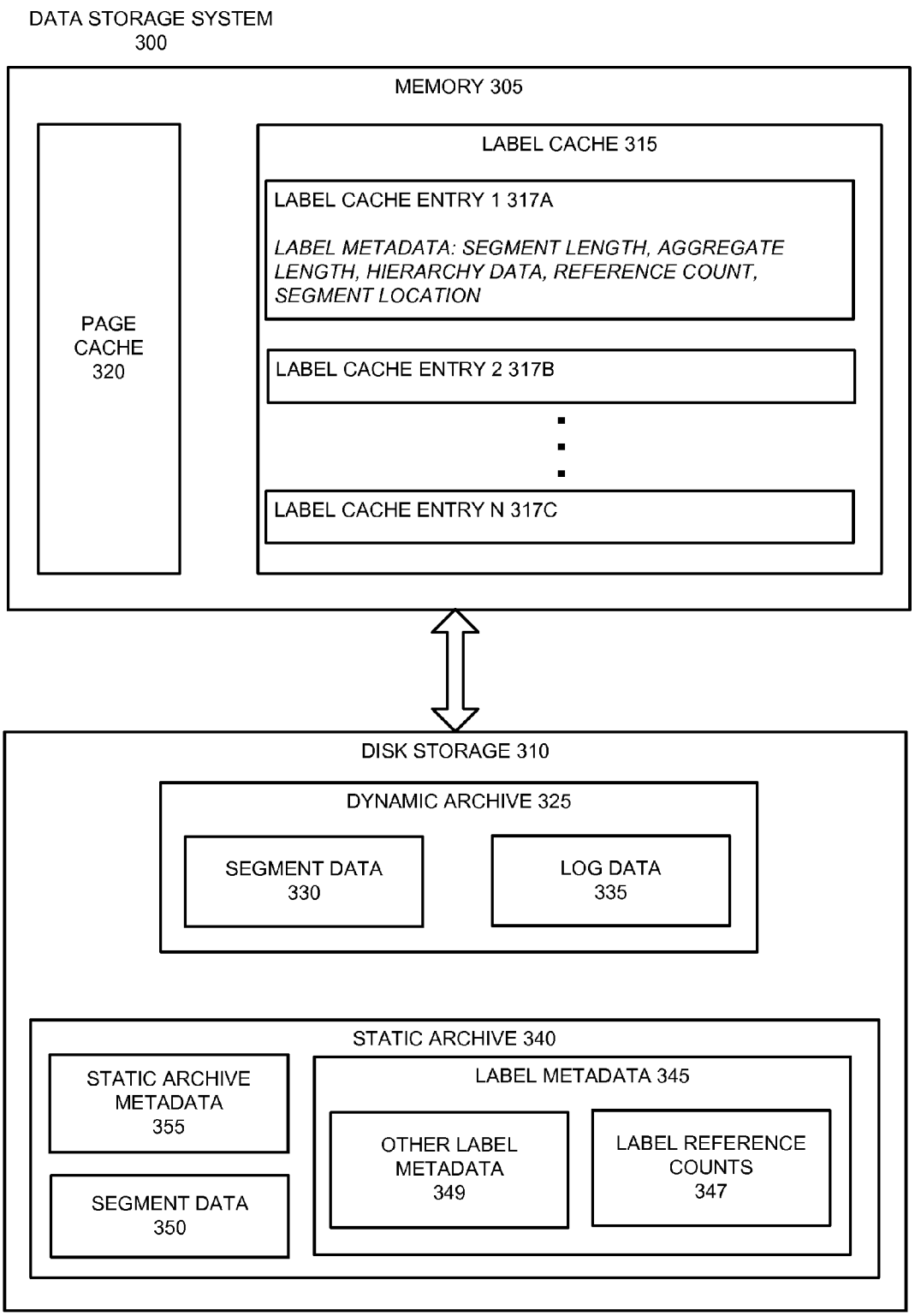
FIG. 3 illustrates a log structured content addressable deduplicated data storage system according to an embodiment of the invention.

FIG. 3 illustrates a log structured content addressable deduplicated data storage system 300 according to an embodiment of the invention. Data storage system 300 maintains data structures in memory 305, such as random access memory or other high-speed data storage devices, and disk storage 310, such as a hard disk storage server or device, disk array, storage area network, or other non-volatile data storage devices.

Storage system 300 includes two types of data structures in memory 305: a label cache 315 and a page cache 320. As discussed above, data to be stored is partitioned into segments, with each unique data segment being associated with a unique label. In an embodiment, label cache 315 stores label metadata, which is the data necessary to maintain an association between a label and its data segment. Label cache 315 includes N number of label cache entries 317, where N is any arbitrary positive integer, including label cache entry 1 317a, label cache entry 2 317b, and label cache entry N 317c.

Each of the label cache entries 317 stores label metadata for maintaining an association with one or more data segments. In an embodiment, the label metadata includes a label; a segment length attribute specifying the length of an associated data segment; and a data segment location specifying a storage location for the associated data segment. In an embodiment, multiple data segments are stored in a flat file format on disk storage 310, as described in detail below, and optionally in page cache 320. In this embodiment, the data segment location may be specified as an offset from the beginning of the flat data segment file.

As described above, labels may be hierarchical and reference one or more additional labels. An embodiment of the label metadata stored by each of the label cache entries 317 includes an aggregate segment length attribute that specifies the total length of all data segments referenced directly or indirectly by a label.

Additionally, an embodiment of the label metadata stored by each of the label cache entries 317 includes one or more reference count attributes. A reference count attribute specifies the number of data layouts that reference an associated data segment. For example, if two files (or other types of data) both include a data segment D1 assigned the label L1, then the label metadata for label L1 will include a reference count attribute value of two. Reference count attributes are used to determine if it is safe to delete a data segment because the data segment is no longer used by any files or other types of data. In a further embodiment, label metadata may include multiple reference count attributes to distinguish between data layouts that reference a label directly and data layouts that reference a label indirectly via a label hierarchy.

An embodiment of the data storage system 300 includes a page cache 320 in memory 305 for caching copies of one or more data pages from the disk storage 310 for faster retrieval. Data storage system 300 uses page cache 320 to store frequently accessed data from the disk storage 310, improving read and optionally write performance.

In an embodiment, data in the disk storage 310 may be organized according to data pages. An embodiment of the page cache 320 defines cache pages in memory 305 and associates these cache pages with cache entries. Each cache entry in page cache 320 is associated with a data page in a file or other entity in disk storage 310. Each cache entry of page cache 320 also maintains the number of outstanding cache page references and a set of cache entry status flags, such as used, dirty, or read pending. In an embodiment, a clock algorithm is used to provide a pseudo-LRU eviction policy for the cache. The page cache 320 may store data pages of compressed or uncompressed data. In an embodiment, the page cache 320 uses an "extended page" to address compressed data. When a page fault occurs with an extended page, an embodiment of the page cache 320 returns an uninitialized page buffer to the calling code and expects it to perform the necessary I/O and/or decompression to fill the page. In an embodiment, page faults associated with normal or extended cache pages may be serviced without holding cache locks.

An embodiment of data storage system 300 includes a disk storage 310. Data storage system 300 stores data segments associated with labels in two types of data structures: one or more dynamic archives 325 and one or more static archives 340. Both dynamic archives 325 and static archives 340 can be searched to retrieve data segments associated with labels. However, in an embodiment, new data segments may only be added to dynamic archives 325.

In an embodiment, a dynamic archive 325 includes segment data 330 and log data 335. Segment data 330 stores one or more data segments. In an embodiment, segment data 330 is a flat file format including one or more data segments arranged into data pages. In this embodiment, a data segment corresponding with a label may be accessed by retrieving the data segment location and size associated with the label from the label cache 315. The data segment location is used as an index into the segment data 330, while the data segment size determines the location of the end of a data segment in the segment data 330.

Dynamic archive 325 also includes log data 335. Log data 335 stores a record of all of mutating operations performed by the data storage system 300. A mutating operation is an operation that has any effect on the state of the segment data 330 in dynamic archive 330 or label cache 315. In an embodiment, these operations include store operations that add new data segments and labels to the data storage system 300, and referencing operations that increase or decrease the reference counts associated with labels. Embodiments of the log data 335 may be used to restore the state of the label metadata in the label cache 315 following a system restart.

In an embodiment, every mutating operation initiated by the data storage system 300 results in the creation of a corresponding transaction record in the log data 335. Each transaction record in the log data includes data and parameters describing the type and effect of the corresponding operation. In an embodiment, when the mutating operation is completed, the log data 335 is updated with a transaction commit record to indicate the success or failure of this operation.

For example, if the data storage system 300, receives an operation specifying the storage of a given data segment and its associated label, an embodiment of data storage system 300 will store a transaction record in log 335 indicating that this operation is being initiated. In an embodiment, the transaction record may include the some or all of the label metadata to be associated with this data segment. The data storage system 300 will then update the segment data 330 and label metadata in label cache 315 accordingly.

In an embodiment, the transaction record representing the initiation of an operation may also include a transaction identifier used to identify the associated operation. When this operation is completed, the data storage system 300 will update the log data 335 with a transaction commit record representing the completion of the operation. In an embodiment, this transaction commit record also includes the transaction identifier associated with the operation. An embodiment of data storage system uses the transaction identifiers to match the transaction records in log data 335 marking the initiation and completion of an operation. In an embodiment, transaction commit records marking the completion of an operation may further include an indicator that specifies whether the associated operation was completed successfully, or whether the associated operation failed or was aborted.

An embodiment of the data storage system 300 defines and stores transaction commit points for operations as atomically updatable attributes of files in the file system. In this embodiment, each transaction record includes a transaction identifier; the type of transaction, such as an update or delete intent; and a handle to the file being modified. The handle may be a file path (for CIFS) or a unique file identifier (for NFS and other file systems).

In this embodiment, an operation is not completed until it is committed by the data storage system 300. When the data storage system 300 commits an operation, the file being modified is atomically updated. For operations with update intent, the data storage system changes an attribute of the file to the transaction identifier associated with this operation. For operations with delete intent, the data storage system removes the file in question.

Upon restarting the data storage system 300, an embodiment of the data storage system 300 replays the completed transaction records in the log data 335 in their original order to recreate the label metadata in the label cache 315. After the all of the transaction records in the log data 335 are processed, the label cache 315 will include the same label metadata as it had prior to being restarted.

Following a restart, an embodiment of the data storage system 300 identifies both completed operations and incomplete operations from the associated transaction records in the log data 335. An embodiment of the data storage system 300 replays the transaction records of each completed operation to reconstruct the label metadata in the label cache.

Additionally, an embodiment of the data storage system 300 may replay transaction records associated with some incomplete operations. For incomplete operations specified by the log data 335, an embodiment of the data storage system 300 examines the state of the attribute of the associated file in the file system. For operations with update intent, if the transaction identifier stored in the file system matches that of the transaction record in the log data, then the data storage system 300 declares this operation as committed and replays it to update the label metadata in the label cache; otherwise, the data storage system declares this operation as aborted and omits it from the replayed transaction records. For operations with delete intent, if the file is absent from the file system, then the data storage system declares it as committed and replays the associated transaction record; otherwise, the data storage system 300 declares the operation as aborted and ignores its transaction records during replay.

In an embodiment, because the transaction commit point is actually an atomic file system operation, any block level snapshot of the file system represents a consistent point-in-time view of the deduplicated volume. Embodiments of the invention may provide these snapshots for usage in volume recovery from backup or for volume replication to an alternate site.

Additionally, the segment data 325 and the transaction records in the log data 335 may be copied at any time in order to create a "snapshot" or self-contained specification of the state the data storage system 300 at that time. In an embodiment, the log data of a dynamic archive includes data structures for searching for segment data and metadata corresponding with a label. This, in combination with the fact that all static archive state is correct in a snapshot, allows embodiments of the data storage system 300 to provide access to volume snapshots using a minimal memory footprint. For example, an embodiment of the data storage system 300 can mount a read-only snapshot of a deduplicated volume without having to reconstitute the in-memory label cache, which would consume substantial amounts of time and memory.

In addition to the dynamic archives 325, disk storage 310 also includes one or more static archives 340. Static archives 325 provide read-only storage of data segments and label metadata. Static archives 325 are adapted for rapid searching for labels and retrieval of corresponding data segments.

In an embodiment, a static archive 340 includes segment data 350 and label metadata 345. Segment data 350 is similar to segment data 330 used in dynamic archives. Label metadata 345 is similar to the type of label metadata stored by label cache 315 and allows labels to be matched with corresponding data segments. In an embodiment, the label metadata 345 in static archive 340 is arranged for efficient searching. For example, B+-trees may be used to organize label metadata 345 in static archive 340.

In an embodiment, some label metadata, such as label reference counts, may be updated within a static archive 340 to allow unused data segments to be marked for deletion. To allow this to be performed efficiently, an embodiment of label metadata 345 is divided into separate data structures for label reference counts 347 and other label metadata 349, including segment sizes and data segment locations. In one implementation, each of these data structures 347 and 349 may be implemented as separate files on disk storage 310 for improved performance.

Additionally, static archives may include static archive metadata 355 to store attributes of the static archive 340. For example, static archive metadata 355 may include attributes indicating the total number of data segments stored in the segment data 350 as well as the number of inactive data segments, which are data segments that are no longer referenced by any data layouts, such as those associated with labels having reference counts of zero.

Dynamic and static archives may use multiple files for efficiency. For example, many types of disk storage devices are more efficient at appending data at the end of an existing file, rather than merging data in the middle of the file. Additionally, smaller files may be more easily cached for quicker access than larger files. To take advantage of these characteristics of disk storage devices, one implementation of data storage system 300 divides each dynamic archive 325 into two separate files: a first file to store segment data 330 and a second file to store log data 335. In this implementation, new transaction records and new data segments are appended to the end of their respective files, avoiding time-consuming data updates within the middle of files. Similarly, an implementation of data storage system 300 divides each static archive 340 into three separate files: a first file to store segment data 350, a second file to store static archive metadata 355 and other label metadata 349, and a third file to store the frequently-accessed label reference counts 347 in the label metadata 345. Depending upon the characteristics of the disk storage devices, other implementations of data storage system 300 may use different arrangements of data files for storing static and dynamic archives.

An embodiment of data storage system 300 interacts with applications and other systems via storage operations. For example, a storage front-end may provide a virtual file system interface with clients and applications and store and retrieve data segments from data storage system 300 using storage operations. Examples of data storage system operations include segment store, segment reference, segment unreference, and segment lookup operations. FIGS. 4A-4D illustrate example deduplicated data storage system operations according to embodiments of the invention.

Figure 4A:
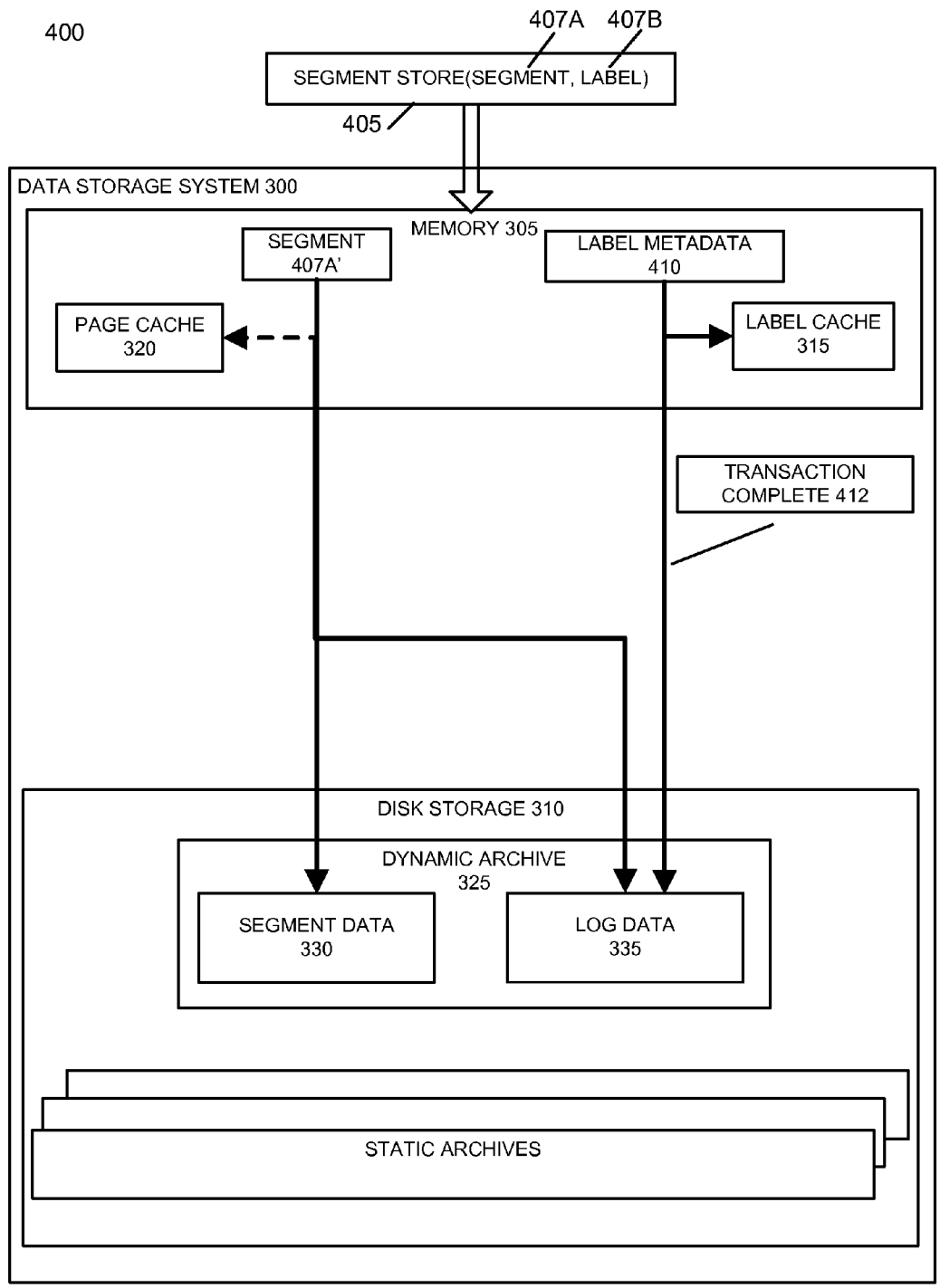
FIGS. 4A-4D illustrate example deduplicated data storage system operations according to embodiments of the invention.

FIG. 4A illustrates an example 400 of a segment store operation within a data storage system according to an embodiment of the invention. A data storage system 300 receives a segment store operation 405. Segment store operation 405 includes a data segment 407a and an associated label 407b to be stored by the data storage system.

To store a data segment and its associated label, an embodiment of data storage system 300 first generates label metadata 410 based on the data segment 407a, the label 407b, and the state of the data storage system 300. For example, the label metadata 410 may include a data segment location for the data segment 407a to be stored that is based on the current location of the end of the segment data 330 in dynamic archive 325.

An embodiment of data storage system 300 then stores a transaction record including the label metadata 410 in log data 335. In an embodiment, the transaction record includes a transaction record number or other identifier. In the event of a system failure during this operation, this transaction record in the log data 335, without any further corresponding data, indicates to the data storage system 300 after it restarts that this operation was not completed. In an embodiment, data storage system 300 appends this transaction record to the end of the log data 335.

Following the storage of the transaction record including the label metadata 410, The data storage system 300 then stores a copy of the data segment 407a' in the segment data 330 of dynamic archive 325 on disk. In an embodiment, data storage system 300 appends the data segment 407a' to the end of the segment data 330 in the dynamic archive 325. An embodiment of data storage system 300 may optionally store the data segment 407a' in page cache 320 in memory 305 for faster retrieval. Additionally, data storage system 300 stores the label metadata 410 in the label cache 315.

Following the successful storage of the label metadata 410 and the data segment 407a', an embodiment of data storage system 300 stores a transaction record 412 in the log data 335 to indicate that the segment store operation 405 has been successfully completed. In an embodiment, the transaction record 412 may include a transaction identifier to indicate which prior transaction record it is associated with. Following a system restart, the presence of matching transaction records in the log data 335 indicates that the corresponding operation was completed prior to the system restart. Conversely, the presence of a single transaction record in the log data 335 without a matching transaction record following a system restart indicates that the corresponding operation was not completed prior to the system restart.

Figure 4B:
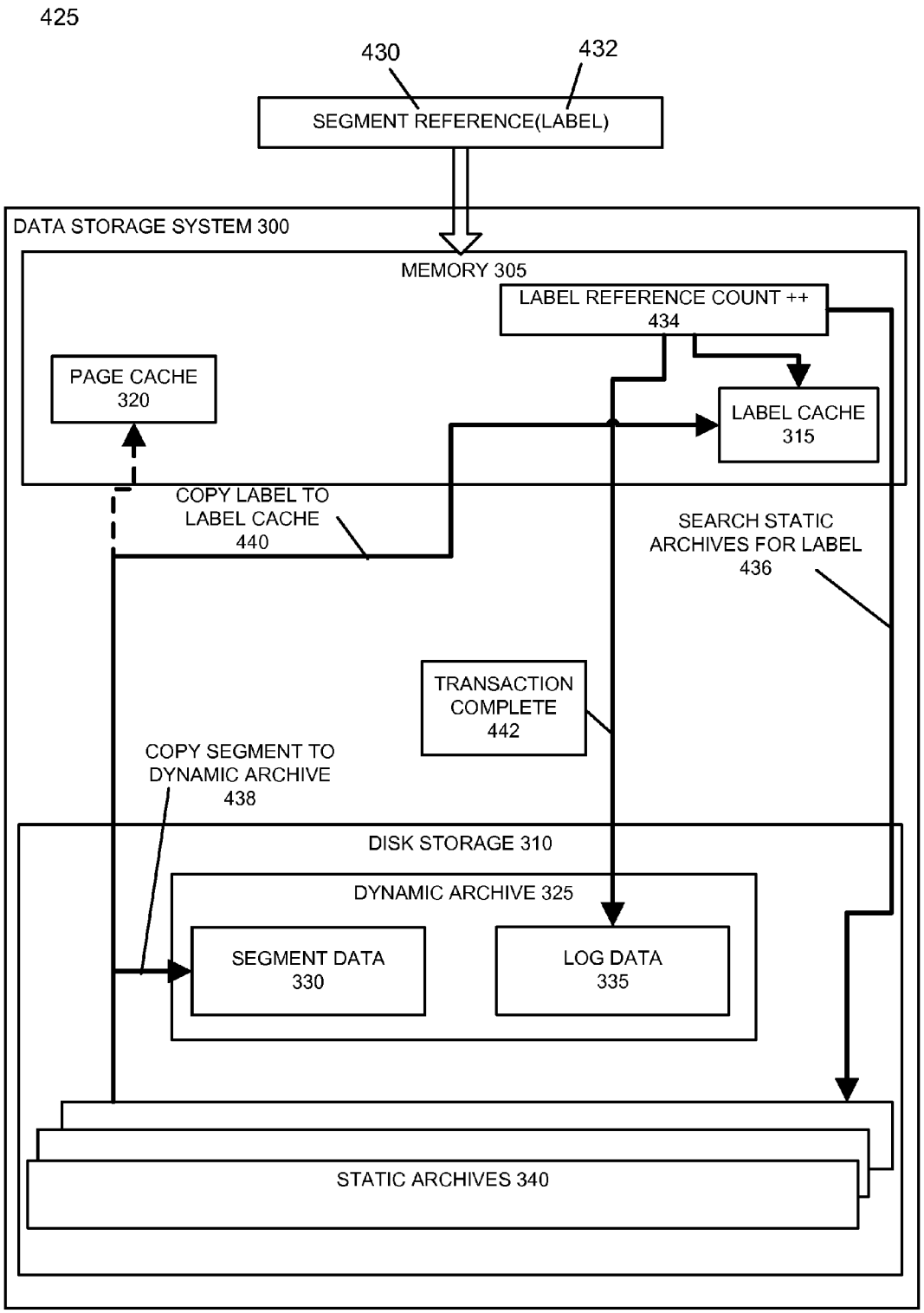

FIG. 4B illustrates an example 425 of a segment reference operation within a data storage system according to an embodiment of the invention. A segment reference operation increments the reference count in the label metadata associated with a data segment, indicating that one or more additional data layouts are using this data segment.

In example 425, a data storage system 300 receives a segment reference operation 430. The segment reference operation 430 includes a label 432, which identifies the label metadata to have its reference count incremented. Segment reference operation 430 may optionally include additional parameters, such as an amount to increment the reference count of a label, or the segment reference operation 430 may be adapted to increment the reference count in label metadata by a default amount.

Upon receiving the segment reference operation 430, data storage system 300 stores a transaction commit record including the label 432 in log data 335. In an embodiment, the transaction commit record includes a transaction record number or other identifier. Following a system restart, the presence of a transaction record and a matching transaction commit record in the log data 335 indicates that the corresponding operations were completed prior to the system restart. Conversely, the presence of a transaction record in the log data 335 without a matching transaction commit record following a system restart indicates that the corresponding operations were not completed prior to the system restart. In an embodiment, the presence or absence of a transaction commit records may be inferred from examination of other system state following a system restart.

In the event of a system failure during this operation, this transaction record in the log data 335, without any further corresponding data, indicates to the data storage system 300 after it restarts that this operation 430 was not completed. In an embodiment, data storage system 300 appends this transaction record to the end of the log data 335.

After the transaction record corresponding with the segment reference operation 430 has been stored in the log data 325, the data storage system 300 searches for label metadata in label cache 315 matching the label 432 specified by the segment reference operation 430. If the label cache 315 includes label metadata matching the label 432, the label reference count 434 of this matching label metadata is incremented and stored in the label cache 315.

If the label cache 315 does not include label metadata matching the label 432 specified by the segment reference operation 430, an embodiment of data storage system 300 initiates a search 436 of one or more of the static archives 340 in disk storage 310 for the label metadata matching this label 432. Upon finding the label metadata matching label 432 in at least one of the static archives 340, an embodiment of the data storage system 300 performs a copy 440 of this label metadata to the label cache 315 in memory 305. For this copy of the label metadata in label cache 315, the reference count is set to 1 or to a higher number if specified by the segment reference operation 430.

In addition to copying the label metadata from one of the static archives 340 to the label cache 315, an embodiment of data storage system 300 also performs a copy 438 of the data segment associated with this label metadata from the static archive 340 to the segment data 330 of the dynamic archive 325. By adding the data segment and its label metadata to the dynamic archive 325 and label cache, respectively, this embodiment of the data storage system 300 ensures that recently used data segments are in the current dynamic archive 325 and possibly the page cache 320 for faster retrieval. In a further embodiment, data storage system 300 may optionally copy the data segment to the page cache 320 for faster retrieval.

Following the completion of either incrementing the label reference count in the label cache 315 or the copying of label metadata and corresponding data segment from one of the static archives 340, an embodiment of data storage system stores a transaction commit record 442 in the log data 335 to indicate that the segment reference operation 430 has been successfully completed. In an embodiment, this transaction commit record indicator 442 may include a transaction record number or other identifier to indicate which prior transaction record it is associated with. Following a system restart, the presence of a transaction record and a matching transaction commit record in the log data 335 indicates that the corresponding operations 430 were completed successfully prior to the system restart. Conversely, the presence of a transaction record in the log data 335 without a corresponding transaction commit record following a system restart indicates that the corresponding operations 430 were not completed prior to the system restart.

Figure 4C:
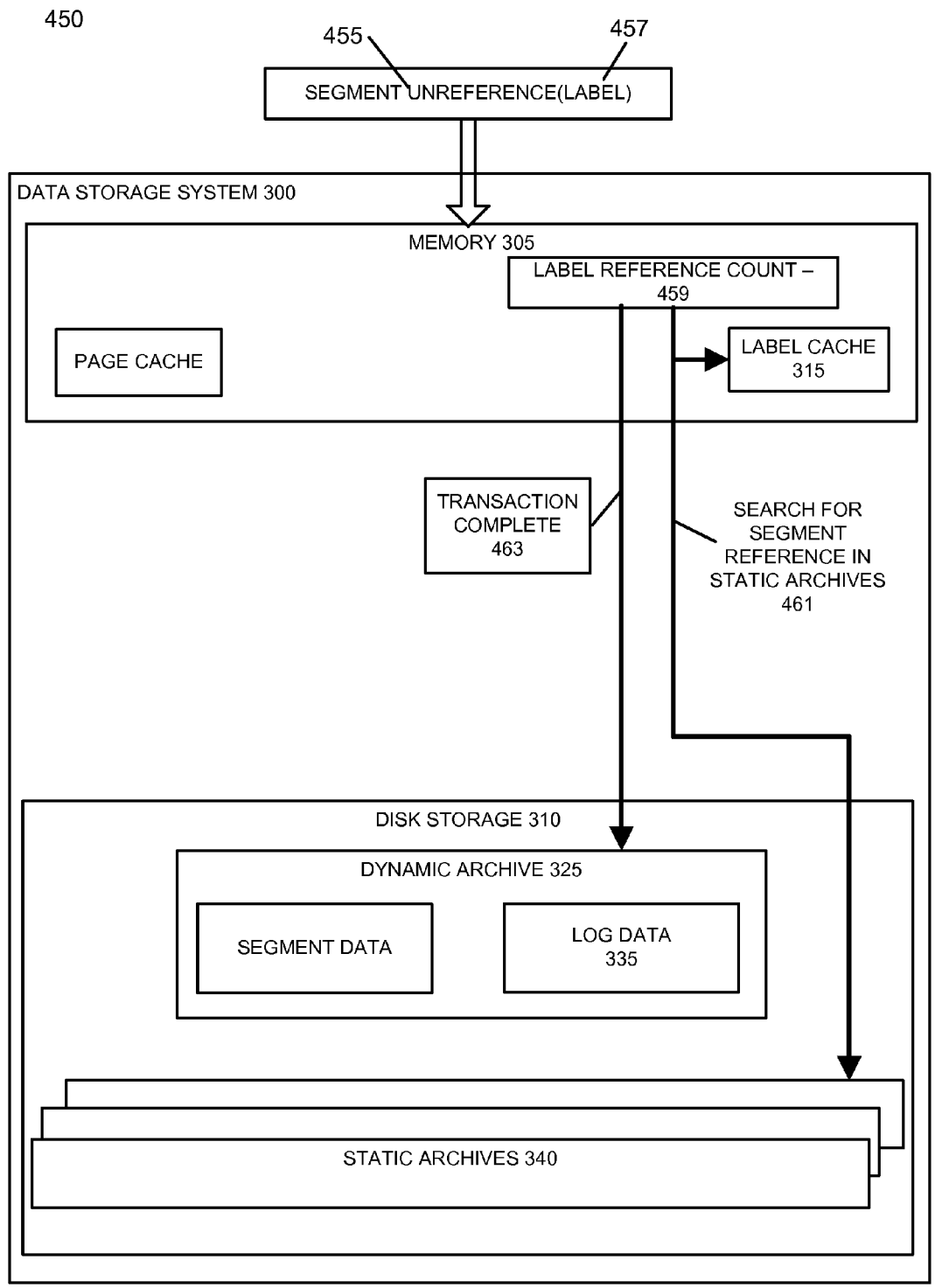

FIG. 4C illustrates an example 450 of a segment unreference operation within a data storage system according to an embodiment of the invention. A segment unreference operation decrements the reference count in the label metadata associated with a data segment, indicating that one or more additional data layouts are no longer using this data segment. When a reference count of a label is decremented to zero, the associated data segment may be deleted from the current dynamic archive or static archive. As discussed in detail below, a merging operation may be performed to delete unused data segments from two or more static archives and merge the remaining data segments and label metadata into a more compact static archive.

In example 450, a data storage system 300 receives a segment unreference operation 455. The segment reference operation 455 includes a label 457, which identifies the label metadata to have its reference count decremented. Segment unreference operation 455 may optionally include additional parameters, such as an amount to decrement the reference count of a label, or the segment unreference operation 455 may be adapted to decrement the reference count in label metadata by a default amount.

Upon receiving the segment unreference operation 455, the data storage system 300 searches for label metadata in label cache 315 matching the label 457 specified by the segment unreference operation 455. If the label metadata matching label 457 is found in the label cache 315, the data storage system 300 stores a transaction record including the label 457 and a dynamic archive indicator in log data 335. The dynamic archive indicator specifies that the label 457 specified by the segment unreference operation is found in the label cache 315. In an embodiment, the transaction record includes a transaction record number or other identifier. In the event of a system failure during this operation, this transaction record in the log data 335, without any further corresponding data, indicates to the data storage system 300 after it restarts that this operation 455 was not completed. In an embodiment, data storage system 300 appends this transaction record to the end of the log data 335.

After the transaction record corresponding with the segment unreference operation 455 has been stored in the log data 325, the data storage system 300 decrements the label reference count 459 of this matching label metadata stored in the label cache 315.

Following the completion of decrementing the label reference count in the label metadata within label cache 315, an embodiment of data storage system stores a transaction commit record 463 in the log data 335 to indicate that the segment unreference operation 455 has been successfully completed. In an embodiment, the transaction record 463 may include the same transaction record number or other identifier associated with the transaction record of segment unreference operation 455.

As described above, an embodiment of data storage system 300 uses the transaction numbers or other identifiers to match the transaction records in log data 335 marking the initiation and completion of any type of mutating operation. In an embodiment, transaction commit records marking the completion of an operation may further include an indicator that specifies whether the associated operation was completed successfully, or whether the associated operation failed or was aborted.

If the label cache 315 does not include label metadata matching the label 457 specified by the segment unreference operation 455, an embodiment of data storage system 300 initiates a search 461 of one or more of the static archives 340 in disk storage 310 for the label metadata matching this label 457. Upon finding the label metadata matching label 457 in at least one of the static archives 340, an embodiment of the data storage system 300 decrements the label reference count in this label metadata within the static archive 340 by the amount specified by operation 455.

In a further embodiment, data storage system 300 may defer the process for searching for labels and decrementing label reference counts in static archives. In this embodiment, if the data storage system 300 does not find label metadata in the label cache 315 matching the label 457 of a segment unreference operation 455, the data storage system 300 stores a transaction record including the label 457 and a static archive indicator in log data 335. The static archive indicator specifies that the label 457 specified by the segment unreference operation is not found in the label cache 315 and needs to be located in a static archive. The data storage system 300 may also store an additional transaction record in log data 335 to indicate that the processing of the segment unreference operation 455 is complete, at least until the log data 335 is later processed.

In an embodiment, the data storage system 300 later reviews the log data 335 to locate one or more transaction records including static archive indicators. In this embodiment, the data storage system 300 extracts the labels from these transaction records and accumulates total decrement values for each extracted label. For example, if log data 335 includes two transaction records (which include static archive indicators) that decrement a label, then the accumulated total decrement value for this label is two. The result of this extraction and accumulation is a list of labels and associated total decrement values. In an embodiment, the data storage system 300 extracts labels and accumulates decrement values during a serialization of a dynamic archive to create a static archive, as described in detail below. Alternate embodiments of the data storage system 300 may delay processing log data 335 for segment unreference operations associated with static archives until any arbitrary time that is convenient for the data storage system 300.

Following the creation of the list of labels and associated total decrement count, an embodiment of data storage system 300 searches one or more static archives for label metadata matching the list of labels. If label metadata matching one or more of the labels is found, the data storage system 300 decrements the reference count within the static archive and the total decrement count accordingly. If the total decrement count associated with a label is greater than the reference count of the matching label metadata within a static archive, an embodiment of the data storage system 300 will carry over the remaining total decrement count and continue to search additional static archives for matching label metadata. If the total decrement count of a label reaches zero, its label is removed from the list of labels. In an embodiment, this search of static archives may be performed as a background or low-priority process.

In a further embodiment, upon decrementing the reference count of label metadata within a static archive 340, the data storage system 300 may determine if the reference count of this label metadata is now equal to zero. If so, the data storage system 300 may update static archive metadata to indicate that this label metadata and its associated data segment are no longer needed in this static archive, if at all. In an embodiment, data storage system 300 increments a count in the static archive metadata of the total number of labels or data segments in the static archive having zero reference counts. In another embodiment, data storage system 300 decrements a count in the static archive metadata of the total number of labels or data segments in the static archive having non-zero reference counts.

Figure 4D:
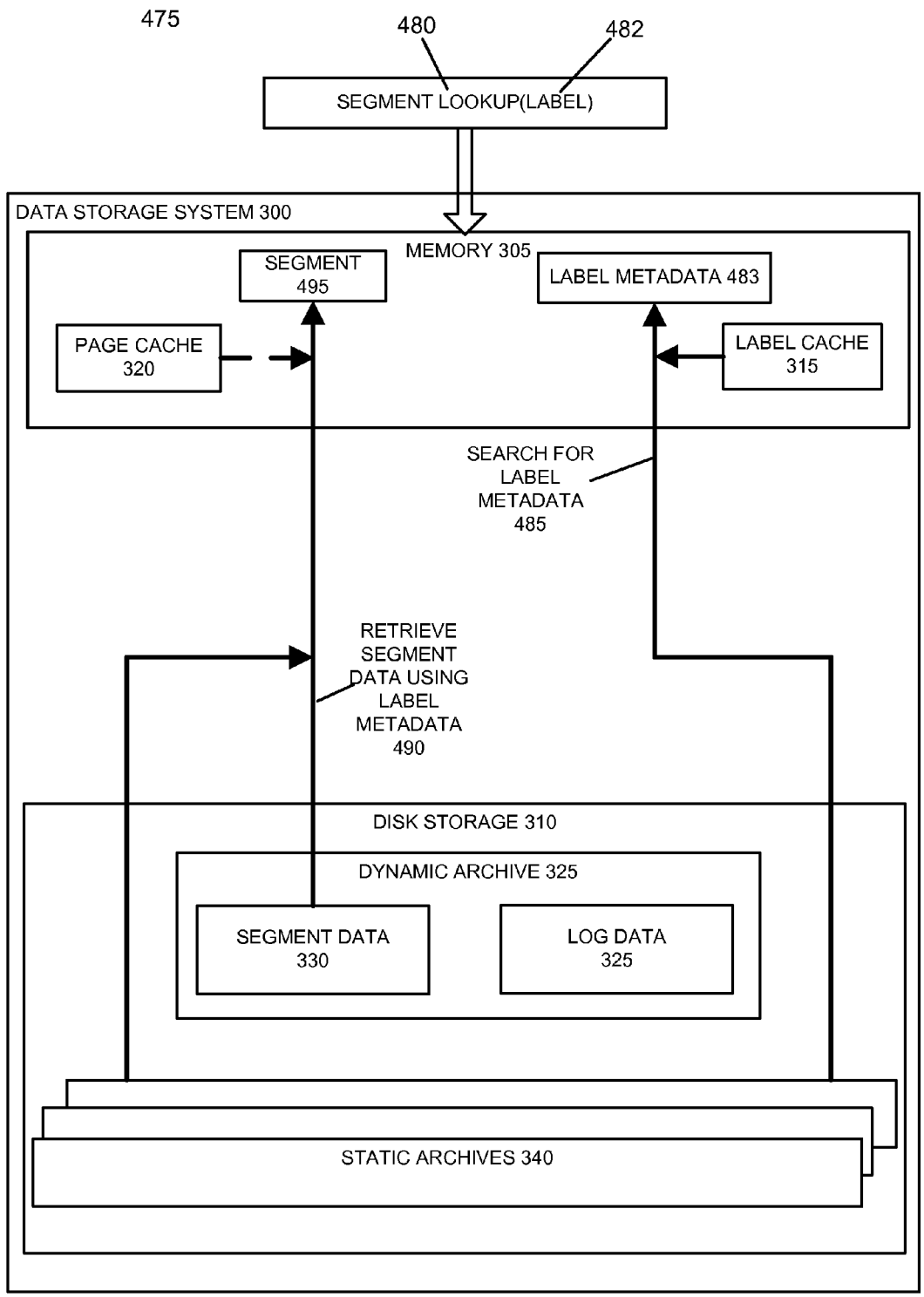

FIG. 4D illustrates an example 475 of a segment lookup operation within a data storage system according to an embodiment of the invention. A segment lookup operation retrieves one or more data segments corresponding with one or more labels. For example, a segment lookup operation may include a label. In response to the segment lookup operation, the data storage system retrieves and returns a sequence of one or more data segments associated with this label. In another example, a segment lookup operation may include multiple labels, in response to which the data storage system returns a sequence of two or more corresponding data segments.

In example 475, a data storage system 300 receives a segment lookup operation 480. The segment lookup operation 480 includes a label 482. In response to segment lookup operation 480, an embodiment of data storage system 300 performs a search 485 for label metadata 483 matching label 482. In an embodiment, the search 485 first looks for the label metadata 483 matching label 482 in label cache 315 in memory 305. If the matching label metadata 483 is not found in label cache 315, an embodiment of data storage system 300 continues the search 485 for matching label metadata 483 in one or more of the static archives 340. In a further embodiment, an embodiment of data storage system 300 searches for matching label metadata 483 in one or more of the most recently accessed static archives 340 first, following the search of the label cache.

Upon locating matching label metadata 483 in either the label cache 315 in memory 305 or a static archive 340 in the disk storage 310, data storage system 300 uses the label metadata 483 to determine the storage location of one or more data segments corresponding with the label metadata 483 and label 482. In an embodiment, data storage system 300 may recursively search for additional label metadata to determine the storage locations of data segments associated with hierarchical labels.

Data storage system 300 then performs a retrieval 490 of one or more data segments corresponding with the label 482. Data storage system 300 may retrieve 490 data segments from the segment data 330 in dynamic archive 325 or from page cache 320 if the matching label metadata 483 was found in label cache 315. Data storage system 300 may retrieve 490 data segments from segment data in one or more static archives 340 if the matching label metadata 483 was also found in a static archive 340. In an embodiment, label metadata 483 and its corresponding data segment are stored, at least in part, in the same static archive 340.

The retrieved data segment or segments 495 are then returned to the requesting entity, such as a user, application, computer system, WAN accelerator, storage front-end, or any other type of entity that provided the segment lookup operation 480 to the data storage system 300. In an embodiment, multiple data segments may be returned in a sequence based on the ordering of two or more labels in the segment lookup operation 480 and/or the arrangement of labels within a hierarchical label structures.

In an embodiment of example 475, the data storage system 300 does not update the log data 325 in response to a segment lookup operation 480. Log data does not need to be updated in this embodiment because the segment lookup operation 480 does not alter any data segments or label metadata. In other embodiments of example 475, the data storage system 300 does update log data 325 in response to a segment lookup operation 480 for other purposes, such as monitoring data access.

Similarly to example 475, embodiments of the data storage system 300 may include metadata-only lookup operations, which retrieve only the metadata associated with a label from a label cache 315 associated with a dynamic archive or from a static archive.

Using the above-described data storage system operations, storage front-ends, WAN accelerators, users, applications, computer systems, and other entities may implement a variety of data deduplicating storage systems. For example, upon receiving a file, a storage front end may partition the file into data segments and generate associated label metadata and a data layout corresponding with the file. The storage front-end may use segment lookup operations to determine if any of the data segments are already stored by the data storage system. For data segments of the file that are already stored in the data storage system, the storage front-end may issue segment reference operations to increase the reference count of the associated label metadata. For data segments of the file that are not stored in the data storage system, the storage front-end may issue segment store operations to store these data segments and associated label metadata. Upon successfully updating the data storage system, the storage front-end may store the data layout representing the file.

Figure 5:
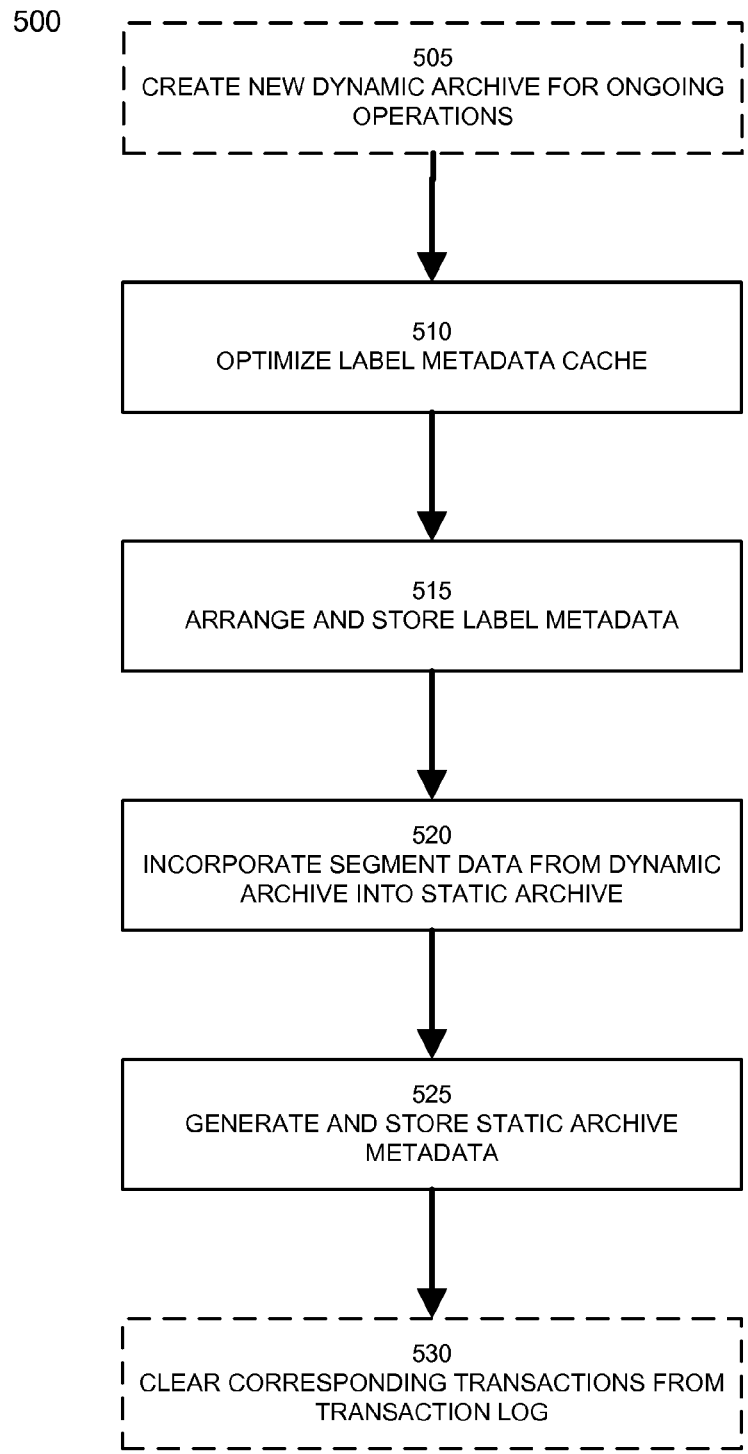
FIG. 5 illustrates a method of changing dynamic segment archives into static segment archives according to an embodiment of the invention.

In an embodiment, dynamic archives and associated label metadata in the label cache may be converted or serialized into a static archive. This serialization can be initiated when the size of the label cache exceeds a threshold, when an administrator requests a storage system snapshot be created, or for any other reason. FIG. 5 illustrates a method 500 of changing dynamic archives into static archives according to an embodiment of the invention.

In an embodiment, method 500 is performed as a background process while the data storage system continues to process storage operations. In this embodiment, optional step 505 creates a new, empty dynamic archive. This new dynamic archive will be used to store data segments received while method 500 is being performed and after method 500 is complete. An embodiment of step 505 also creates a new log data for the new dynamic archive to log transaction records of operations performed while method 500 is being performed. A further embodiment of step 505 also creates a new empty label cache in memory to store label metadata associated with any storage operations received while method 500 is being performed.

Step 510 optimizes the label metadata stored in the label cache prior to the initiation of method 500. In an embodiment, step 510 sorts label metadata for efficient on-disk searching and storage. In a further embodiment, step 510 creates a B+-Tree data structure to assist in searching for label metadata after it has been stored in a static archive.

Step 515 arranges and stores the label metadata and the B+-Tree data structure in one or more files to be included in the static archive. In an embodiment, step 515 stores the reference count label metadata in a separate file from the rest of the label metadata and the B+-Tree data.

Step 520 incorporates the segment data including the data segments of the prior dynamic archive into the static archive. In an embodiment, the file or files storing the segment data of the prior dynamic archive are added to the static archive without any further processing.

Step 525 generates static archive metadata. In an embodiment, the static archive metadata includes the total number of data segments and labels in the static archive and the number of labels in the static archive having a reference count equal to zero. In an embodiment, the static archive metadata includes a listing of all of the files included in this static archive. Embodiments of step 525 store static archive metadata within one of the files already included in the static archive, such as files including segment data or label metadata, or within a new file added to the static archive.

Following the successful completion of steps 505 to 525, the static archive representing the prior dynamic archive and associated label metadata is complete. As a result, the transaction records created during the processing of this prior dynamic archive are no longer needed in case of a system restart, because the label metadata is now stored on disk within the static archive. Thus, optional step 530 may delete all or a portion of the log data associated with the prior dynamic archive. In a further embodiment, step 530 may extract labels associated with deferred segment unreference operations from the log data, as described above, for processing by a background or low-priority application or process.

As discussed above, a segment unreference operation may decrement a reference count for a label stored in a static archive. When a reference count of a label reaches zero, this indicates that the associated data segment is no longer needed within that static archive, if at all. Over time, a static archive may contain many labels with reference counts of zero and thus many unnecessary corresponding data segments. An embodiment of the invention deletes unnecessary data segments and associated label metadata from the disk storage by merging two or more static archives together.

Figure 6:
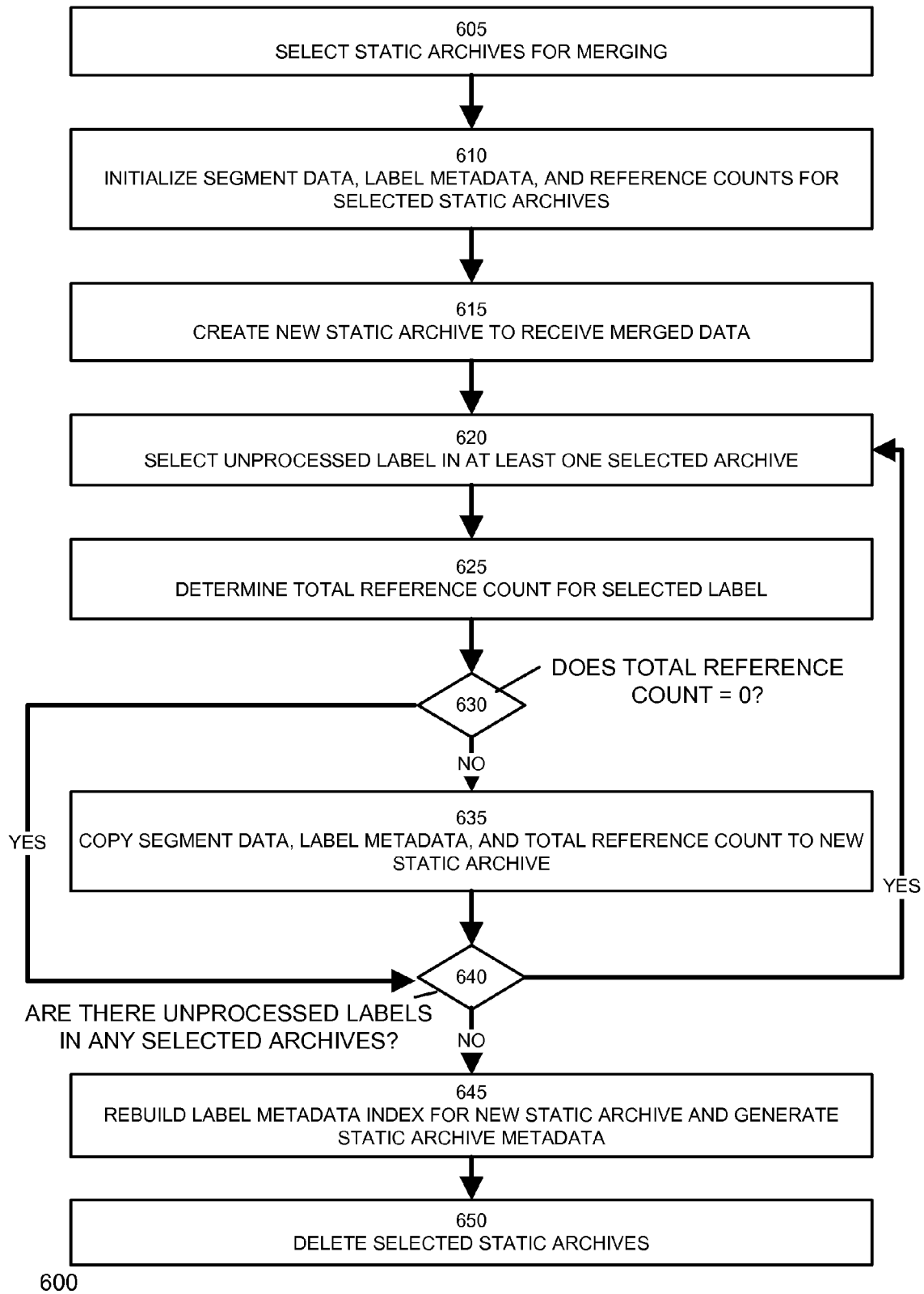
FIG. 6 illustrates a method of merging static segment archives according to an embodiment of the invention.

FIG. 6 illustrates a method 600 of merging static archives according to an embodiment of the invention. Step 605 selects two or more static archives for merging. Embodiments of step 605 may select static archives based on a variety of criteria, including as the total number or proportion of labels in each static archive that have reference counts of zero; the size, number, and frequency of access of static archives; and the available capacity of the disk storage of the data storage system.

Step 610 initializes data structures to access and process the contents of the selected static archives. In an embodiment, step 610 initializes data structures for segment data, reference count label metadata, and other label metadata of the selected static archives.

Step 615 creates a new static archive to receive the merged contents of the selected static archives. Step 615 may create one or more files adapted to store the merged contents of the selected static archives. In an embodiment, the new static archive includes files and data structures similar in type to those within the selected static archives to be merged.

Step 620 selects a label from one of the selected static archives that has not been processed by steps 620 to 640 of method 600.

Step 625 determines the total reference count of this label from the label metadata associated with this label in all of the static archives. For example, if there are three selected static archives to be merged, and the selected label in found in two of these static archives, step 625 will determine the total reference count associated with the selected label from these two static archives. In an embodiment, step 625 searches each of the selected static archives, for example using an associated data structure such as a B+-Tree, to determine if any additional static archives also include the selected label. Step 625 then sums the reference counts from the label metadata associated with the selected label from one or more of the static archives to determine the total reference count of the selected label.

Decision block 630 determines if the total reference count of the selected label is equal to zero. If so, then the selected label, its associated label metadata, and its associated data segment may be omitted from the new static archive. As a result, method 600 proceeds to decision block 640.

Conversely, if decision block 630 determines that the total reference count of the selected label is not equal to zero, then method 300 needs to include the selected label, its associated label metadata, and one or more associated data segments in the new static archive. As a result, method 300 proceeds to step 635.

Step 635 adds the selected label, its associated label metadata, and one or more associated data segments to the new static archive. Embodiments of step 635 add the selected label, its associated label metadata, and one or more associated data segments to the new static archive to one or more files comprising the new static archive.

In an embodiment of step 635, the one or more data segments associated with the selected label are copied to the segment data in the new static archive. Step 635 also copies the label metadata associated with the selected label. In an embodiment, step 635 may modify portions of the label metadata to account for differences between the selected static archive and the new static archive, such as the different storage location of the associated data segment in the new static archive. Additionally, step 635 sets the reference count for the label metadata to the total reference count, reflecting the merger of label metadata for the selected label from two or more static archives.

Decision block 640 determines if there are any unprocessed labels in the selected static archives. If so, then method 600 proceeds back to step 620. Otherwise, method 600 proceeds to step 645.

Step 645 organizes the label metadata in the new static archive for efficient searching. In an embodiment, step 645 creates and stores a B+-Tree data structure to assist in searching for label metadata in the new static archive. Step 645 also generates any static archive metadata required by the new static archive.

Following the successful creation of the new static archive, the static archives selected for merging are no longer needed. As a result, step 650 deletes the selected static archives.

Figure 7:
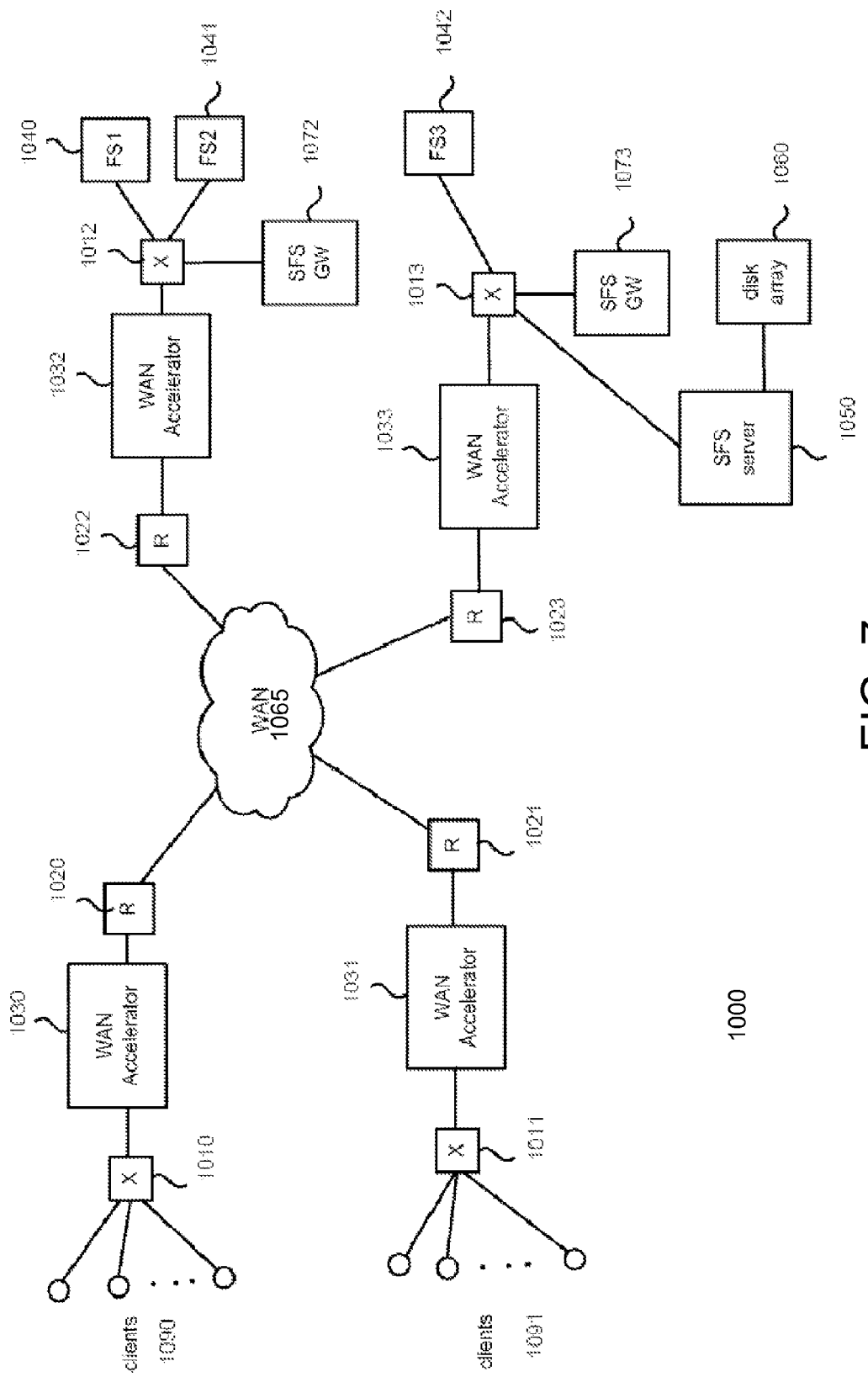
FIG. 7 illustrates an example hybrid WAN acceleration and deduplicating data storage system suitable for use with embodiments of the invention.

FIG. 7 illustrates an example hybrid WAN acceleration and deduplicating data storage system 1000 suitable for use with embodiments of the invention. FIG. 7 depicts one configuration including two segment-orientated file server (SFS) gateways and an SFS server situated at two different sites in a network along with WAN accelerators configured at each site. In this configuration, clients in groups 1090 and 1091 access files ultimately stored on file servers 1040, 1041, and 1042. Local area networks 1010, 1011, 1012, and 1013 provide data communications between clients, SFS gateways, SFS servers, file servers, WAN accelerators, wide-area networks, and other devices. Local area networks 1010, 1011, 1012, and 1013 may include switches, hubs, routers, wireless access points, and other local area networking devices. Local area networks are connected via routers 1020, 1021, 1022, and 1023 with a wide-area network (WAN).

The clients may access files and data directly using native file server protocols, like CIFS and NFS, or using data interfaces, such as database protocols. In the case of file server protocols, local or remote clients access file and data by mounting a file system or "file share." Each file system may be a real file system provided by a file server such as file servers 1040, 1041, and 1042, or a virtual file system provided by a SFS gateway or storage front-end, such as SFS gateways 1072 and 1073. Once a file system is mounted via a transport connection, files can be accessed and manipulated over that connection by applications or file system tools invoked by the user. Traditionally, these protocols have performed poorly over the WAN but are accelerated by the WAN accelerators present in the network.

For example, a client in group 1091 might access file server 1040 and WAN accelerators 1030 and 1032 would optimize that file server connection, typically providing "LAN-like" performance over the WAN using techniques as those described in U.S. Pat. No. 7,120,666 entitled "Transaction Accelerator for Client-Server Communication Systems"; U.S. Pat. No. 6,667,700 entitled "Content-Based Segmentation Scheme for Data Compression in Storage and Transmission Including Hierarchical Segment Representation"; and U.S. Patent Publication 2004/0215746, published Oct. 28, 2004 entitled "Transparent Client-Server Transaction Accelerator", which are incorporated by reference herein for all purposes.

If a client, for example, from group 1091, mounts one of the exported file systems located on SFS gateway 1073 via a transport connection including WAN 1065, WAN accelerators 1031 and 1033 will optimize network traffic for passage through WAN 1065. In an embodiment, each of the WAN accelerators 1031 and 1033 will partition network traffic into data segments, similar to those described above. WAN accelerators 1031 and 1033 will cache frequently used data segments.

In an example of prior systems, when one of the clients 1090 requests a file, WAN accelerator 1032 reads the requested file from a file system and partitions the file into data segments. WAN accelerator 1032 determines the data layout or set of data segments comprising the requested file. WAN accelerator 1032 communicates the data layout of the requested file to WAN accelerator 1030, which in turn attempts to reconstruct the file using the data layout provided by WAN accelerator 1032 and its cached data segments. Any data segments required by a data layout and not cached by WAN accelerator 1030 may be communicated via WAN 165 to WAN accelerator 1030.

Further benefits are achieved, however, by arranging for clients to access the files stored on file servers 1040, 1041 and 1042 via the SFS gateways 1072 and 1073 or SFS server 1050. In this scenario, SFS gateways 1072 and 1073 export one or more virtual file systems. The SFS gateways 1072 and 1073 may implement data deduplicated storage using the file servers 1040 and/or 1041 to store data segments, data layouts, and file or other metadata.

To improve performance, an embodiment of system 1000 allows WAN accelerators to access data segments and data layouts directly in deduplicating data storage using a SFS protocol. In this embodiment, when one of the clients 1090 requests a file, WAN accelerator 1032 accesses a SFS gateway, such as SFS gateways 1072 and 1073, or a SFS server, such as SFS server 1050, to retrieve the data layout of the requested file directly. WAN accelerator 1032 then communicates this data layout to WAN accelerator 1030 to reconstruct the requested file from its cached data segments. The advantage to this approach is that WAN accelerator 1030 does not have to read the entire requested file and partition it into data segments; instead, the WAN accelerators leverage the segmentation and data layout determinations already employed by the data deduplicating storage.

Furthermore, if WAN accelerator 1030 requires data segments that are not locally cached to reconstruct some or all of the requested file, WAN accelerator 1032 can retrieve these additional data segments from an SFS gateway or SFS server using a SFS protocol. In this example, WAN accelerator 1032 may retrieve one or more data segments from a file system or SFS server using their associated labels or other identifiers, without requiring any reference to any data layouts or files.

The benefits of the SFS architecture can accrue to an SFS file server as depicted in FIG. 7, whereby SFS server 1050 is interconnected to disk array 1060. In an embodiment, the SFS server acts as a combination of a SFS gateway and an associated file server or data storage system. For example, SFS server 1050 manages its own file system on a raw volume directly, e.g., located on a disk array and accessed via iSCSI or Fibre channel over a storage-area network (SAN). In this scenario, there is no need for backend file servers, because the SFS server 1050 implements or interfaces with its own data storage system. The SFS server 1050 may include an external disk array as depicted, such as a storage area network, and/or include internal disk-based storage.

The SFS server 1050 is configured by an administrator to export one or more virtual file systems or other data interfaces, such as database, object servers providing access to objects including data and methods, data structures, or applications, such as e-mail server APIs. Then, a client, for example, from group 1090 mounts one of the exported virtual file systems or interfaces located on SFS server 1050 via a transport connection. This transport connection is then optimized by WAN accelerators 1030 and 1033. Furthermore, because these WAN accelerators are SFS-aware, they intercommunicate with SFS server 1050 using SFS rather than a legacy file protocol like CIFS or NFS. In turn, the SFS server stores all of the data associated with the file system on its internal disks or external storage volume over a SAN.

In a further embodiment, the data deduplication storage system may leverage the use of WAN accelerators to partition incoming data into data segments and determine data layouts. For example, if one of the clients 1090 attempts to write a new file to the storage system, WAN accelerator 1030 will receive the entire file from the client. WAN accelerator 1030 will partition the received file into data segments and a corresponding data layout. WAN accelerator 1030 will send the data layout of this new file to WAN accelerator 1032. WAN accelerator 1030 may also send any new data segments to WAN accelerator 1032 if copies of these data segments are not already in the data storage. Upon receiving the data layout of the new file, WAN accelerator 1032 stores the data layout and optionally file metadata in the data deduplicating file system. Additionally, WAN accelerator 1032, a SFS gateway, and/or a SFS server issues one or more segment operations to store new data segments and to update reference counts and other label metadata for all of the data segments referenced by the new file's data layout. By using WAN accelerator 1030 to partition data, the processing workload of the SFS gateways or SFS server in a data deduplicating storage system is substantially reduced.

Similarly, if a client is directly connected with local area network 1012, rather than connecting through LAN 165, an embodiment of a SFS gateway or SFS server redirects all incoming data from the local client to a local WAN accelerator, such as WAN accelerator 1032, for partitioning into data segments and for determining the data layout.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of storing data in a data storage system, the method comprising:
   identifying a first storage label associated with a reference operation, wherein the first storage label is associated with a first previously stored data segment;
   generating a first transaction record including an identifier associated with the storage operation;
   storing the first transaction record in a transaction log data structure;
   searching a label cache to locate first label metadata matching the first storage label;
   in response to locating the first label metadata matching the first storage label in the label cache, changing a reference count included in the first label metadata, wherein the reference operation includes a reference count that specifies the number of occurrences of the first storage label referencing the first data segment;
   in response to not locating the first label metadata matching the first storage label in the label cache:
      generating a second transaction record indicating that the label metadata matching the storage label is not located in the label cache;
      storing the second transaction record in the transaction log data structure;
      searching the transaction log data structure to identify a plurality of transaction records, including the second transaction record, that indicate that a set of label metadata, including the first label metadata, corresponding with a plurality of storage labels, including the first storage label, are not located in the label cache;
      searching at least one label metadata archive to locate each of the set of the label metadata matching the each of the plurality of storage labels, including the first label metadata matching the first storage label;
      in response to locating the first label metadata matching the first storage label in the at least one label metadata archive, changing the reference count included in the first label metadata; and
      generating a third transaction record including the identifier, wherein the third transaction record is adapted to indicate that the reference operation is complete; and
   storing the third transaction record in the transaction log data structure.

2. The method of claim 1, wherein changing the reference count included in the label metadata includes increasing the reference count.

3. The method of claim 2, wherein in response to locating the label metadata matching the storage label in the label metadata archive, the method further comprises:
   copying at least one data segment associated with the label from a data segment archive associated with the label metadata archive to a storage location in a data segment storage data structure;
   retrieving a copy of the matching label metadata from the label metadata archive;
   updating the copy of the matching label metadata to include the storage location; and
   storing the updated copy of the matching label metadata in the label cache.

4. The method of claim 2, wherein:
   the reference operation is associated with a reference increment value; and
   increasing the reference count includes adding the reference increment value to the reference count.

5. The method of claim 1, wherein identifying the storage label associated with the reference operation comprises:
   receiving unsegmented data;
   partitioning the unsegmented data to form at least the data segment;
   determining if the data segment storage data structure includes a copy of the data segment; and
   in response to the determination that the data segment storage data structure includes the copy of the data segment, generating the reference operation.

6. The method of claim 5, wherein determining if the data segment storage data structure includes a copy of the data segment comprises:
   generating the storage label; and
   searching the data segment storage data structure using the storage label to determine if the data segment storage data structure includes a copy of the data segment.

7. The method of claim 5, wherein partitioning the unsegmented data includes determining a frequency value indicating the number of occurrences of the data segment included in the unsegmented data.

8. The method of claim 1, wherein the storage label is based at least in part on at least one data characterization of the data segment.

9. The method of claim 8, wherein the data characterization is based on at least a first hash of the data segment.

10. The method of claim 9, wherein the data characterization includes a second hash based on at least the first hash of the data segment.

11. The method of claim 1, wherein changing the reference count includes decreasing the reference count.

12. The method of claim 11, wherein searching at least one label metadata archive to locate the label metadata matching the storage label and, in response to locating the label metadata matching the storage label in the label metadata archive, changing the reference count included in the label metadata are performed after storing the second transaction record.

13. The method of claim 12, wherein searching at least one label metadata archive to locate the label metadata matching the storage label and, in response to locating the label metadata matching the storage label in the label metadata archive, changing the reference count included in the label metadata are performed by a background application process.

14. The method of claim 1, wherein the data segment includes a portion of data from a group consisting of:
a file; a database record; an object including object data and object methods; a data structure; and application data.

15. The method of claim 1, comprising:
identifying a file system file associated with the reference operation; and
initiating an atomic file system operation on the file system file;
receiving an indication that the atomic file system operation on the file system file is complete; and
in response to the indication that the atomic file system operation is complete, generating and storing the second transaction record to indicate a committal of the storage operation.

16. The method of claim 1, wherein the reference count includes occurrences of the storage label included in a hierarchy of storage labels.

17. The method of claim 1, wherein:
the reference operation is associated with a first reference count value;
the plurality of transaction records includes a fourth transaction record associated with a second reference operation, wherein the second reference operation is associated with the first storage label and a second reference count value; and
changing the reference count included in the first label metadata comprises:
adding the first and second reference count values to create an accumulated reference count value; and
changing the reference count included in the first label metadata by the accumulated reference count value.

* * * * *